US012605690B2

(12) United States Patent
Marx et al.

(10) Patent No.: US 12,605,690 B2
(45) Date of Patent: Apr. 21, 2026

(54) METHOD AND SYSTEM FOR CONTROLLING AN ULTRASOUND GENERATOR OF A MACHINE TOOL FOR MACHINING A WORKPIECE

(71) Applicant: DMG MORI Ultrasonic Lasertec GmbH, Stipshausen (DE)

(72) Inventors: Heiko Marx, Morbach (DE); Viktor Dolinger, Bernkastel-Kues (DE); Fabian Franzmann, Veitsrodt (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 930 days.

(21) Appl. No.: 17/798,004

(22) PCT Filed: Feb. 2, 2021

(86) PCT No.: PCT/EP2021/052407
§ 371 (c)(1),
(2) Date: Aug. 5, 2022

(87) PCT Pub. No.: WO2021/156239
PCT Pub. Date: Aug. 12, 2021

(65) Prior Publication Data
US 2023/0050109 A1 Feb. 16, 2023

(30) Foreign Application Priority Data
Feb. 7, 2020 (DE) ..................... 10 2020 201 540.6

(51) Int. Cl.
*B01J 19/10* (2006.01)
*B06B 1/02* (2006.01)

(52) U.S. Cl.
CPC ............. *B01J 19/10* (2013.01); *B06B 1/0269* (2013.01); *B06B 1/0284* (2013.01)

(58) Field of Classification Search
CPC ...... B01J 19/10; B06B 1/0269; B06B 1/0284; B06B 1/0253; B23Q 1/00; B23Q 1/0009; B24B 23/00; B24B 49/10
See application file for complete search history.

(56) References Cited

U.S. PATENT DOCUMENTS

| | | |
|---|---|---|
| 4,879,528 A | 11/1989 | Gotanda |
| 4,965,532 A | 10/1990 | Sakurai |

(Continued)

FOREIGN PATENT DOCUMENTS

| | | |
|---|---|---|
| DE | 4400210 A1 | 8/1995 |
| DE | 69605170 T2 | 7/2000 |

(Continued)

OTHER PUBLICATIONS

Translation of Japanese Office Action, dated Aug. 29, 2023, for Japanese Patent Application No. 2022 547852. (6 pages).

(Continued)

*Primary Examiner* — Emily P Pham
(74) *Attorney, Agent, or Firm* — Seed Intellectual Property Law Group LLP

(57) ABSTRACT

The invention relates to a system and a method for controlling an ultrasound generator of a machine tool for generating ultrasound for machining a workpiece. According to the invention, a determined phase shift of the ultrasound is analyzed as a function of frequency and, based on the analysis, a regulation algorithm for controlling the frequency of the ultrasound generated by the ultrasound generator is determined.

10 Claims, 8 Drawing Sheets

S10 — Specify a resonance range

S11 — Generate electrical signals with different frequencies

S12 — Apply the ultrasonic waves to a tool by means of the electrical signals

S13 — Determine a phase shift of the ultrasound

S14 — Analyze the phase shift as a function of frequency

S15 — Determine a regulation algorithm for controlling the frequency of the ultrasound generator S16 — Machine the workpiece

(56) References Cited

U.S. PATENT DOCUMENTS

| | | | |
|---|---|---|---|
| 5,637,947 | A | 6/1997 | Kising et al. |
| 5,739,724 | A | 4/1998 | Alexandre et al. |
| 2010/0102672 | A1* | 4/2010 | Hoffman ............... B06B 1/0253 |
| | | | 310/317 |
| 2018/0200854 | A1 | 7/2018 | Ketelaer |

FOREIGN PATENT DOCUMENTS

| | | | |
|---|---|---|---|
| JP | H02265681 | A | 10/1990 |
| JP | H07303379 | A | 11/1995 |
| JP | H09276797 | A | 10/1997 |
| JP | 2018526231 | A | 9/2018 |
| WO | 2008/135350 | A2 | 11/2008 |

OTHER PUBLICATIONS

Chinese Office Action, dated Jan. 24, 2025, for Chinese Patent Application No. 202180013486.0 (21 pages) (with English translation).

Communication Pursuant to Article 94(3) EPC dated Oct. 14, 2024, for corresponding EP Application No. 21703020.4. (12 pages).

Decision of Refusal, dated Feb. 6, 2025, for Korean Patent Application No. 10-2022-7030468. (14 pages)(with translation).

German Office Action, dated Jul. 28, 2020, for German Patent Application No. 10 2020 201 540.6. (6 pages) (with partial English translation).

German Office Action, dated Jul. 11, 2022, for German Patent Application No. 10 2020 201 540.6. (10 pages) (with partial English translation).

International Search Report, mailed May 4, 2021, for International Patent Application No. PCT/EP2021/052407. (6 pages) (with English translation).

Korean Request for the Submission of an Opinion dated Jun. 18, 2024, for the 1 corresponding Korean Patent Application No. 10-2022-7030468, 21 pages. (With English Translation).

* cited by examiner

METHOD AND SYSTEM FOR CONTROLLING AN ULTRASOUND GENERATOR OF A MACHINE TOOL FOR MACHINING A WORKPIECE

TECHNICAL FIELD

Method and system for controlling an ultrasound generator of a machine tool for generating ultrasound for machining a workpiece.

TECHNICAL BACKGROUND

Machine tools allow a flexible, in most cases chip-removing, machining of workpieces. Therefore, a machine tool comprises a plurality of different tools used depending on component dimensions and the material to be machined. Usually, the chip-removing machining of metallic materials occurs by milling or lathe processing with a geometrically specified edge. However, brittle-hard workpieces such as ceramic may, due to their material-specific properties, be only insufficiently machined by means of a geometrically specified edge. In such applications, machining by ultrasound often appears appropriate for cost-effectively and efficiently machining a workpiece.

For this purpose, machine tools are known in the art, in which the tool kinematics of the conventional, e.g., grinding or chip-removing, machining process is supported by additionally superimposing a high-frequency vibration. This oscillation generates, at a contact between tool and workpiece, movement amplitudes in the range of a few micrometers, resulting in a reduction of the process forces.

Such machine tools with an ultrasonic functionality comprise an ultrasound generator generating an ultrasonic vibration, which is transmitted mostly through a piezo system to a tool holder, which is for example exchangeably insertable in the milling spindle.

There, the efficiency of the workpiece machining by ultrasonic machining depends, among others, on the geometry of the used tool and its clamping length.

DESCRIPTION OF THE INVENTION

The object of the invention is to provide a method and a system, respectively, for controlling an ultrasound generator of a machine tool for generating ultrasound for machining a workpiece, which enable an optimized ultrasonic machining by the machine tool.

This object is solved by the features of the independent claims 1 and 8. The dependent claims thereby refer to special embodiments of the invention.

A method for controlling an ultrasound generator of a machine tool for generating ultrasound for machining a workpiece according to the invention comprises the following step: generating electrical signals with different frequencies, the frequencies being in the ultrasonic frequency range. Thereby, an optimal usage of the natural frequency of a vibrating system for machining a workpiece may be reached. In some embodiments, electrical signals with different frequencies may be generated in a row. In some embodiments, a generated electrical signal may comprise multiple superimposed electrical signals with different frequencies.

Preferably, all frequency points of the different frequencies are part of a predetermined frequency band that determines a possible operational range regarding frequency. This may have the advantage of ensuring that the regulation of the frequency also satisfies the requirements of the workpiece machining regarding frequency.

In particularly advantageous embodiments, generating electrical signals with different frequencies may comprise a sweep (frequency pass) of a predetermined frequency spectrum. In some embodiments, the frequency spectrum of the different frequencies, particularly of a sweep (frequency pass), may depend on a tool (mass, temperature), machining parameters (feed, rotational speed, infeed), and/or one or more workpiece properties such as material, geometry, size, mass.

Another step of the method is applying ultrasonic waves to a tool via the electrical signals. In applying the ultrasonic waves, a generated electrical signal, for example, may be converted to a mechanical signal (ultrasound), particularly by means of a motor such as a piezoelectric motor.

The method further comprises the following steps: determining a phase shift (phase shift angle) of the ultrasound as a function of frequency, analyzing the phase shift as a function of frequency, and determining a regulation algorithm for controlling the frequency of the ultrasound generated by the ultrasound generator depending on the analysis of the phase shift.

Determining a phase shift of the ultrasound may, for example, comprise determining a phase shift angle (phase shift) between an electric voltage of the generated electrical signal and an electric current of the generated electrical signal.

An analysis of the phase shift may comprise a quantitative comparison of the phase shift as a function of frequency to phase reference values.

This has an advantage that, for different workpiece machinings of the machine tool by means of ultrasound, the frequency of the ultrasound may be easily and efficiently regulated such that the vibrated tool is as resonant to the ultrasonic wave as possible. Thereby, an energy expenditure (in the form of ultrasound) may be reduced to deflect an operational range of a tool with a predetermined amplitude.

Using different regulation algorithms based on the analysis of the phase shift as a function of frequency has an advantage that controllers (regulation algorithms) may be designed particularly efficiently and stable. Further, errors in determining the phase shift as a regulation magnitude, for example, due to noise, may be neglected.

In a particularly advantageous configuration of the method, for example, when the analysis of the phase shift reveals that, at a frequency point, a first phase reference value is gone below, the method may comprise the steps of specifying a phase-shift regulation target, regulating the frequency generated by the ultrasound generator for reaching the phase-shift regulation target, and machining a workpiece while the frequency of the ultrasonic waves is being regulated. With the condition that, at a frequency point, a first phase reference value is gone below, it may be determined whether the predetermined regulation target may (approximately) be reached. On that basis, a regulation algorithm may be optimized. This has an advantage that the controller may be designed particularly efficiently and robustly.

The phase-shift regulation target may, for example, be a phase shift of 0° or be in the range close to 0°, which means that, at a corresponding frequency, the body with the ultrasound applied is in resonance. This has an advantage that ultrasonic waves overlaying each other amplify and thereby, the energy expenditure for reaching a predetermined amplitude of the ultrasonic wave may be reduced.

The first phase reference value may advantageously have a value in particular 3° above the phase regulation target. This may have the advantage that an overshoot during the regulation/control, for example, at a phase regulation target of regulating to a phase value of 0°, does not lead to a modification of the regulation algorithm.

In a particularly efficient embodiment, when the phase-shift regulation target can be reached by means of two different frequencies, the frequency generated by the ultrasound generator for reaching the phase-shift regulation target may be regulated to a higher frequency of the two different frequencies. This has the advantage that a required energy expenditure for generating a predetermined deflection may be reduced.

In a particularly advantageous configuration, when, for example, the phase-shift regulation target may be reached by means of two or multiple different frequencies, the frequency generated by the ultrasound generator for reaching the phase-shift regulation target may be regulated to a frequency at which an impedance (resistance) for generating the ultrasonic waves is lower compared to impedance values of the two or more different frequencies. This has an advantage that in ultrasound generation, for example by means of piezo motors, a lower voltage is required for generating a predetermined ultrasound excitation.

In a particularly optimized embodiment, when, for example, the analysis of the phase shift reveals that, at all frequency points, a first phase reference value is exceeded and/or, in at least one frequency point, a second phase reference value is gone below, the method may comprise the steps of regulating the frequency generated by the ultrasound generator such that the phase shift is minimal and machining a workpiece while the frequency of the ultrasonic waves is being regulated.

This may have the advantage that a minimum controller, which is particularly efficient for finding the minimum, is used, when, for example, it is to be expected that a phase regulation target of 0° may not be reached. Thereby, control of the ultrasound generator and thus the machine tool for improving the workpiece machining regarding energy conservation and machining speed for a workpiece may be optimized.

In particularly versatile embodiments, when, for example, the analysis of the phase shift reveals that, at all frequency points, a second phase reference value is exceeded, the method may comprise the steps of determining a frequency of the different frequencies, where the determined phase shift at this frequency is minimal, machining a workpiece while the frequency of the ultrasonic waves is being regulated, and varying the frequency in a predetermined machining frequency band around the determined frequency during workpiece machining.

This may have the advantage that, particularly with phase noise and a low saliency of a minimum of the phase shift, the tool may be excited as well as possible, so that the tool is resonant to the excitation. Thereby, an energy expenditure required to vibrate the tool to a predetermined degree may be reduced.

In preferred embodiments, the machining frequency band may be a band of ±600 Hz around a center frequency. In some embodiments, varying the frequency of a frequency sweep may, particularly, comprise a frequency pass. This may, for example, occur linearly by means of a voltage-controlled oscillator (VCO).

In particularly advantageous embodiments, especially in varying the frequency with discrete values, the step size at the edges of the frequency band may be larger than in the center of the machining frequency band.

In particularly advantageous embodiments, the method may comprise the steps of determining the phase shift between the generated ultrasound and the reflected ultrasonic wave as a function of frequency, while the frequency is being varied; analyzing the phase shift as a function of frequency; determining a new frequency from the machining frequency band around the determined frequency with minimum phase shift; and varying the frequency in the machining frequency band around the newly determined frequency.

This has an advantage that, particularly when a minimum of the phase shift is difficult to recognize, control of the frequency to a more resonant frequency range of the tool by iterative adjustment may be improved. Thereby, the energy expenditure for workpiece machining may be minimized.

In particularly flexible embodiments, the method may comprise the steps of determining the phase shift between the generated ultrasound and the reflected ultrasonic wave as a function of frequency during workpiece machining, analyzing the phase shift as a function of frequency during workpiece machining, and changing the regulation algorithm for controlling the frequency of the ultrasound generated by the ultrasound generator depending on the analysis of the phase shift.

This has the advantage that control of the ultrasound generator, particularly regarding the regulation algorithm, is instantaneously (particularly during workpiece machining) adapted, optimally and depending on the embodiment, to modifications of the system parameters, which occur, for example, due to heat sources, tool characteristics, workpiece properties, machining characteristics etc. Thereby, the workpiece machining may be improved regarding quality, speed, and energy expenditure.

A system according to the invention for controlling an ultrasound generator of a machine tool for generating ultrasound for machining a workpiece comprises an ultrasound generator for generating ultrasonic waves for machining a workpiece, a phase-shift determination unit for determining a phase shift of the ultrasound, an evaluation unit for analyzing the phase shift as a function of frequency and determining a regulation algorithm depending on the analysis of the phase shift, and a control unit for regulating the frequency depending on a phase shift between generated and reflected ultrasonic wave and depending on the determined regulation algorithm.

An ultrasound generator may, for example, comprise a piezo motor for converting an electric current to a mechanical movement, and/or a frequency generator for generating an electric current and an electric voltage, respectively, at a predetermined frequency.

In some embodiments, the ultrasound generator may generate electrical signals with different frequencies. In some embodiments, electrical signals with different frequencies may be generated in a row. In some embodiments, a generated electrical signal may comprise multiple superimposed electrical signals with different frequencies. An electrical signal may, for example, be converted to ultrasound by means of one or more piezo motors.

An example of a phase shift of the ultrasound is a phase shift between current and voltage of an electrical signal that is converted to ultrasound.

The phase-shift determination unit may be an analog and/or a digital circuit for determining a phase shift. Therefore, in some embodiments, the phase-shift determination unit may comprise one or more analog-digital converters (ADC).

For analyzing the phase shift, the evaluation unit may comprise an analog and/or a digital circuit. Therefore, in some embodiments, the evaluation unit may comprise one or more analog-digital converters.

In some embodiments, the control unit may comprise an analog regulation circuit and/or a digital regulation. In some embodiments, control may occur in discrete time or continuous time. In some embodiments, a control parameter of the regulation may be output in quantized or continuous values. The control unit may be configured to regulate/control a frequency of the ultrasound generated by means of the ultrasound generator.

In some embodiments, the ultrasound generator, the phase-shift determination unit, the evaluation unit, and/or the control unit, or parts of the mentioned units, respectively, may be fused to one unit.

In a particularly advantageous implementation of the invention, the evaluation unit may be configured for analyzing the phase shift and for determining a regulation algorithm during workpiece machining.

Thereby, a workpiece machining may be monitored regarding quality. In some embodiments, the machine tool may control a machining speed depending on the analysis of the phase shift. Thereby, the lifetime due to lower wear may be improved.

In particularly flexible embodiments of the invention, the control unit may be configured for changing the regulation algorithm during workpiece machining. This has an advantage that machining a workpiece, during machining, is adapted to the system parameters. Thereby, workpiece machining may be improved regarding energy consumption and quality of workpiece machining.

In a particularly optimized embodiment of the invention, the system may be configured for executing a method of one of the claims 1 to 7. Thereby, the system may be optimized, regarding workpiece machining, to the system parameters, so that the energy expenditure, the machining speed, and the tool wear may be optimized.

A method according to the invention for controlling an ultrasound generator of a machine tool for generating ultrasound for machining a workpiece comprises the steps of generating electrical signals with different frequencies for machining a workpiece; applying ultrasonic waves to a tool via the electrical signals, particularly by means of piezo motors; determining a phase shift (phase shift angle) of the ultrasound as a function of frequency; determining a frequency at which the phase shift has a minimum; varying the frequency in a predetermined machining frequency band around the determined frequency; and machining the workpiece.

Thereby, particularly with a resonance of a tool that is difficult to detect or with noise superimposed on the signal, the tool may be excited by ultrasound such that an amplitude of the ultrasound with low energy expenditure may be generated.

In particularly advantageous embodiments, the method may comprise the further steps of determining the phase shift of the ultrasound as a function of frequency during workpiece machining; determining a new frequency at which the phase shift has a minimum after the frequency in the predetermined machining frequency band around the determined frequency has been varied; and varying the frequency in a predetermined machining frequency band around the newly determined frequency.

This has an advantage that the method reacts particularly efficiently to modified system parameters such as modifications of the temperature, workpiece mass, shape of a workpiece, tool, etc.

A system according to the invention for controlling an ultrasound generator of a machine tool for generating ultrasound for machining a workpiece comprises an ultrasound generator for generating ultrasonic waves for machining a workpiece, a phase-shift determination unit for determining a phase shift of the ultrasound, an evaluation unit for analyzing a phase shift of the ultrasound and for determining a frequency at which the phase shift has a minimum, depending on the analysis of the phase shift; and a control unit for varying the frequency in a predetermined machining frequency band around the determined frequency.

In some embodiments, the ultrasound generator may generate electrical signals with different frequencies. In some embodiments, electrical signals with different frequencies may be generated in a row. In some embodiments, a generated electrical signal may comprise multiple superimposed electrical signals with different frequencies. An electrical signal may, for example, be converted to ultrasound by means of one or more piezo motors.

An example of a phase shift of the ultrasound is a phase shift between current and voltage of an electrical signal that is converted to ultrasound.

DESCRIPTION OF THE DRAWING

Other details and advantages and individual embodiments of the invention will become clear based on the following description of FIGS. 1 to 6 of the drawings.

FIG. 1 schematically shows a method for controlling an ultrasound generator of a machine tool according to an embodiment of the invention. In the method, steps may be added, separated, merged, and/or executed in parallel, without deviating from the invention. Moreover, the sequence of the steps may be modified without thereby impairing the invention.

Figure 1:
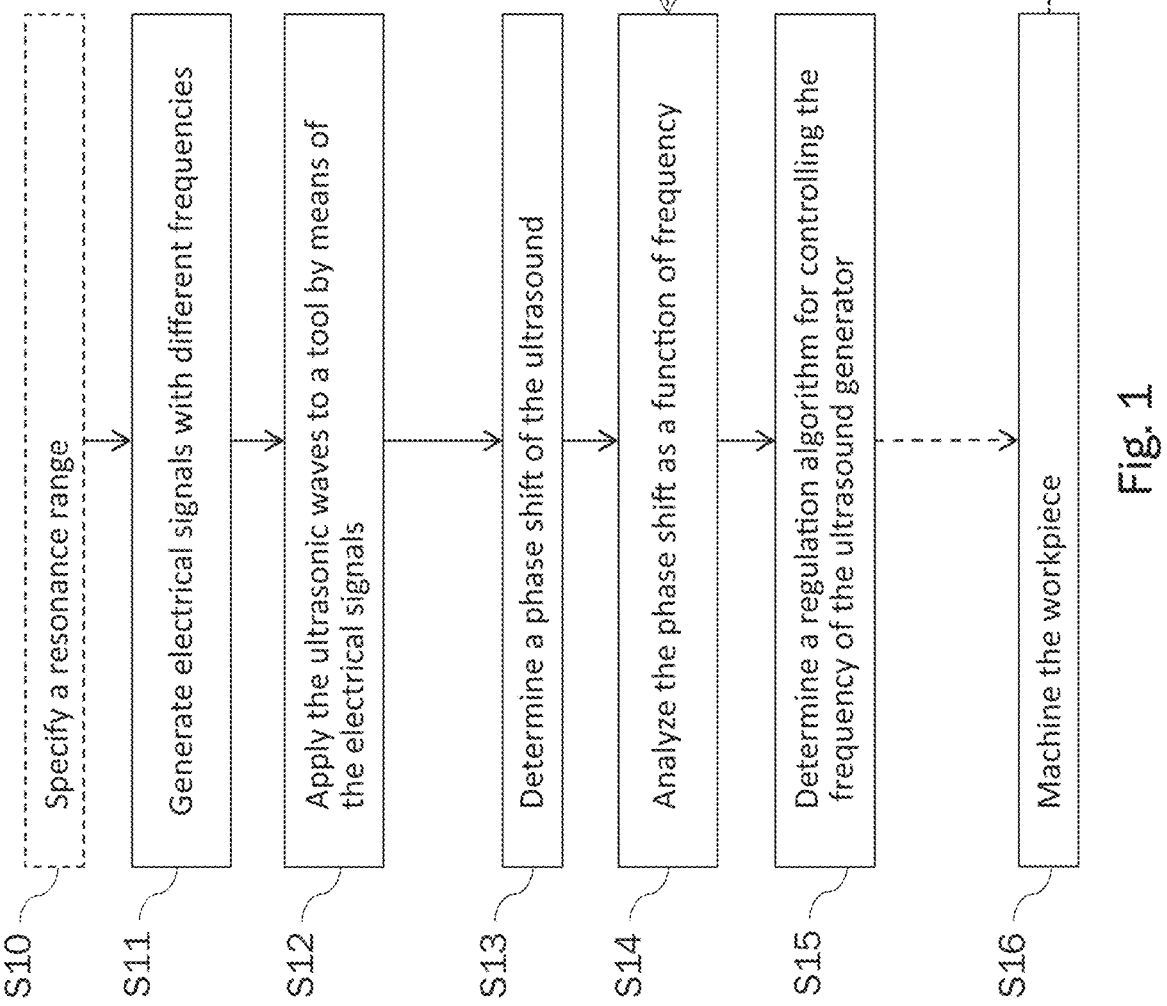
FIG. 1 schematically shows a method for controlling an ultrasound generator of a machine tool according to an embodiment of the invention.

In a first step S11, electrical signals with different frequencies are generated. Therefore, in some embodiments, an electrical signal with a plurality of frequencies (wide frequency spectrum) may be generated. Therefore, in some embodiments, electrical signals with different frequencies may be generated in sequence.

In another step S12, ultrasonic waves are applied to a tool by means of the electrical signals. This means, the tool or part of the tool is vibrated by applying the ultrasonic wave. Applying the ultrasonic waves may, for example, occur by converting the electrical signals to ultrasound, particularly by means of one or more piezo motors. In some embodiments, the ultrasound may be generated directly at/on the tool by a corresponding motor at/on the tool.

Step S13 comprises determining a phase shift of the ultrasound as a function of frequency. This may, for example, occur by an algorithm, particularly for determining the phase shift between electric current and electric voltage of the electrical signal being converted to ultrasound. In some embodiments, the phase shift may also be determined analogously.

In another step S14, the phase shift is analyzed as a function of frequency. This may comprise comparing the phase shift as a function of frequency to one or more phase reference values. In some embodiments, analyzing the phase shift may comprise a qualitative evaluation of the phase shift as a function of frequency.

In some embodiments, a predetermined frequency band may not be given, but may be determined by the analysis of the phase shift.

Depending on the analysis in step S14, a regulation algorithm for controlling the frequency of the ultrasound is determined in step S15. Preferred examples for regulation algorithms used within the invention are varying the frequency in a predetermined frequency band (frequency pass), particularly sweeping, wherein the frequency band is re-determined after a pass depending on a minimum of the phase shift; minimum algorithms configured to minimize a regulation magnitude by means of a regulation parameter (manipulated variable), particularly by means of convex optimization, as well as regulation algorithms configured to regulate a regulation magnitude by means of a manipulated variable (regulation parameter) to a predetermined value, for example a zero crossing.

A minimum algorithm may, for example, the steps of detecting a minimum at a first frequency, increasing the first frequency to a second frequency; comparing the phase shift of the first frequency to the phase shift of the second frequency; taking the second frequency as the first frequency when the phase shift of the second frequency is smaller than the phase shift of the first frequency; reducing the first frequency to a second frequency when the phase shift of the second frequency is larger than the phase shift of the first frequency, comparing a phase shift of the second frequency to the phase shift of the first frequency; taking the second frequency as the first frequency, when the phase shift of the second frequency is smaller than the phase shift of the first frequency.

Depending on the number of switches between increasing and decreasing the first frequency, the step size in increasing and decreasing the frequency, respectively, may be enlarged and reduced, respectively.

In another step S16, the workpiece is machined. During the workpiece machining S16, returning to step S14 is possible, depending on the embodiment. Thereby, the frequency of the ultrasound may be adapted to system modifications (modifications affecting the resonance frequency of the tool).

In some embodiments, step S11 is preceded by a step S10, in which a frequency band is specified. Preferably, the different frequencies generated in step S11 are included in the frequency band specified in step S10. Thereby, it may be ensured that the frequency of the ultrasound is regulated to a predetermined resonance and not to resonances of higher order or lower order.

Figure 2:
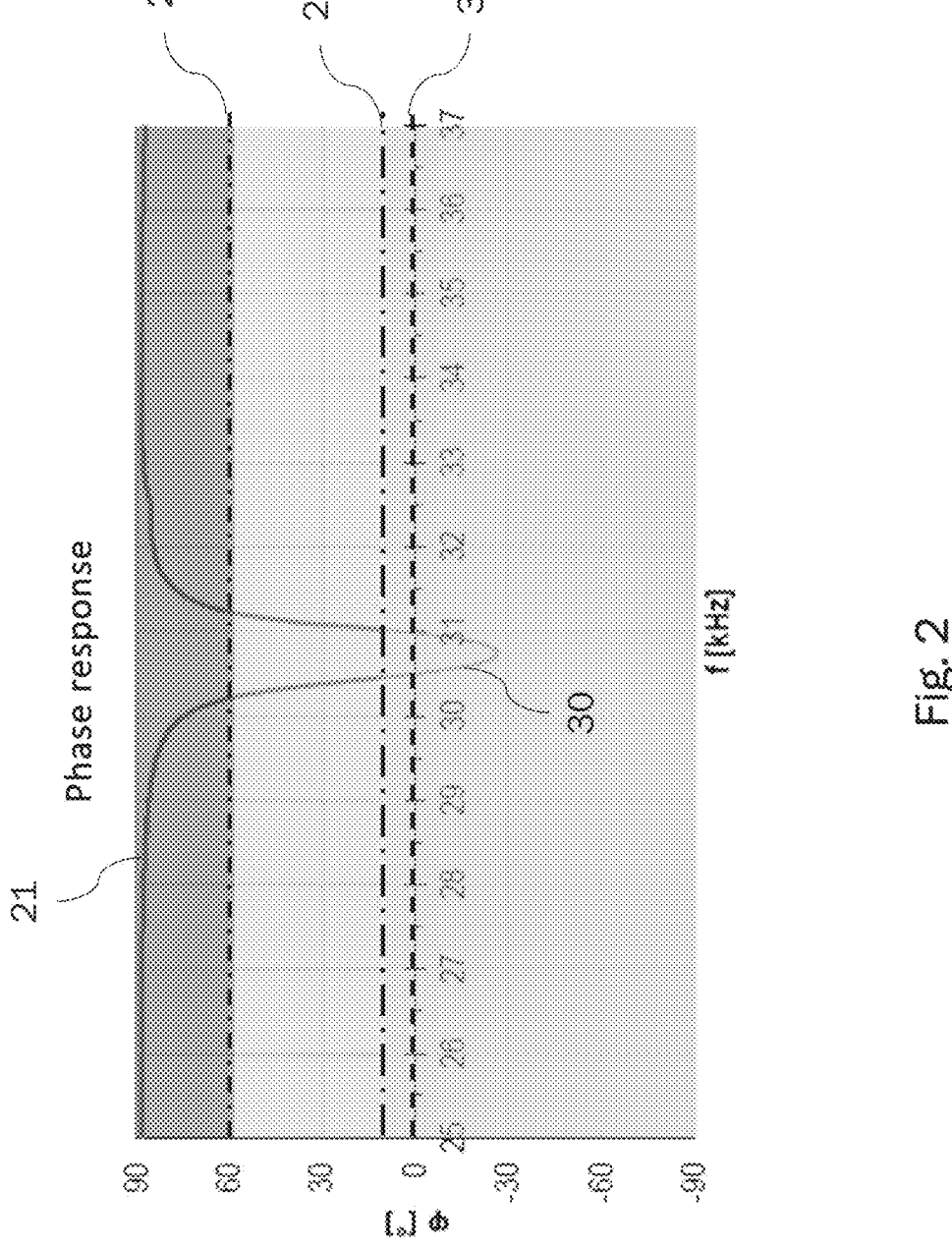
FIG. 2 shows a phase response of a phase shift determined according to the invention, of ultrasound as a function of frequency.

FIG. 2 shows a phase response of a phase shift determined according to the invention, of an ultrasound as a function of frequency. Along the X axis, frequency is given in kilohertz. On the Y axis, the phase shift Phi is given in degrees. The phase response 21 shown in FIG. 2 as a function of frequency goes, at its minimum 30, below the first phase reference value 23. The first phase reference value may, for example, have the value 3°. Due to the minimum of the phase response going below the first phase reference value 23, the frequency of the ultrasonic waves is to be regulated to a phase-shift regulation target 31. In the example shown in FIG. 2, the regulation target is 0°.

If the minimum 30 of the phase response 21 is in a range between the first phase reference value 23 and the second phase reference value 24, the frequency of the ultrasound is to be regulated to a frequency with minimum phase shift 30.

If the minimum 30 of the phase response 21 does not go below the phase reference value 24, or if the minimum 30 of the phase response 21 does exceed the phase reference value 24, respectively, according to the invention, it is advantageous to use a sweep algorithm (pass through a predetermined frequency band). This has an advantage that, particularly with a phase response superimposed by noise, optimal results may be still achieved. In the diagram shown in FIG. 2, the second phase reference value 24 is about 58° and the first phase reference value 23 is about 5°. Here, the regulation target 31 is set to 0°. However, the values of the first and second phase reference values as well as of the regulation target may be varied. Reasonably, the qualitative ratio of these magnitudes should be maintained.

In some embodiments, the first phase reference value 23 may match the second phase reference value 24, only one first or second phase reference value may exist, and other phase reference values may exist, respectively, so that a regulation algorithm for controlling the frequency of the ultrasound generated by the ultrasound generator is determined only from two or from a plurality of regulation algorithms for controlling the ultrasound generator regarding frequency depending on the analysis of the phase shift.

Figure 3:
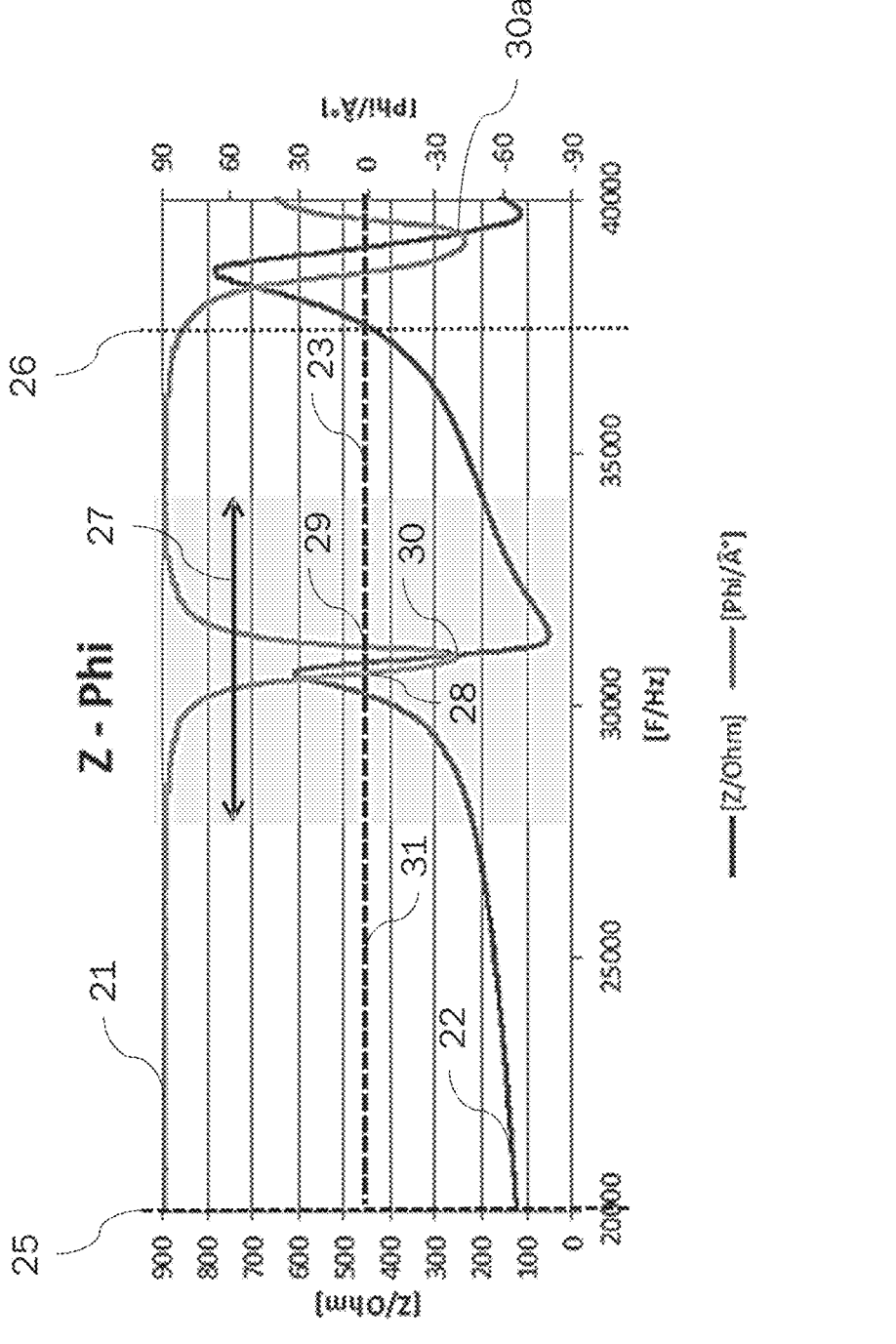
FIG. 3 shows a phase response of a phase shift determined according to the invention, of ultrasound as a function of frequency.

FIG. 3 exemplarily shows a phase response of a phase shift determined according to the invention, as a function of frequency. In FIG. 3, similar to FIG. 2, a phase response 21 comprising a minimum 30 is shown. In FIG. 3, the scaling of the phase is shown on the right side and an impedance scaling is shown along the Y axis on the left side. On the X axis, frequency is shown in hertz.

In addition to the phase response 21 shown in FIG. 2, FIG. 3 shows an impedance response 22. Thereby, the impedance response 22 as a function of frequency may be determined to show a maximum at a first zero crossing 28 of the phase response, and the impedance 22 to approximately show a minimum at a second zero crossing 29 of the phase response. Due to this, in an ultrasound generator controlled as a function of a current, it is advantageous to control the frequency to a frequency with a low impedance value.

It is also visible in FIG. 3 that the phase response may comprise multiple minimums 30, 30a. Therefore, it may be reasonable to limit the operational range regarding the frequency spectrum to a predetermined frequency band, for example, by means of a lower limit 25 and an upper limit 26. Thus, it may be ensured that the frequency generated by the ultrasound generator is regulated to a predetermined resonance of the tool.

Figure 4:
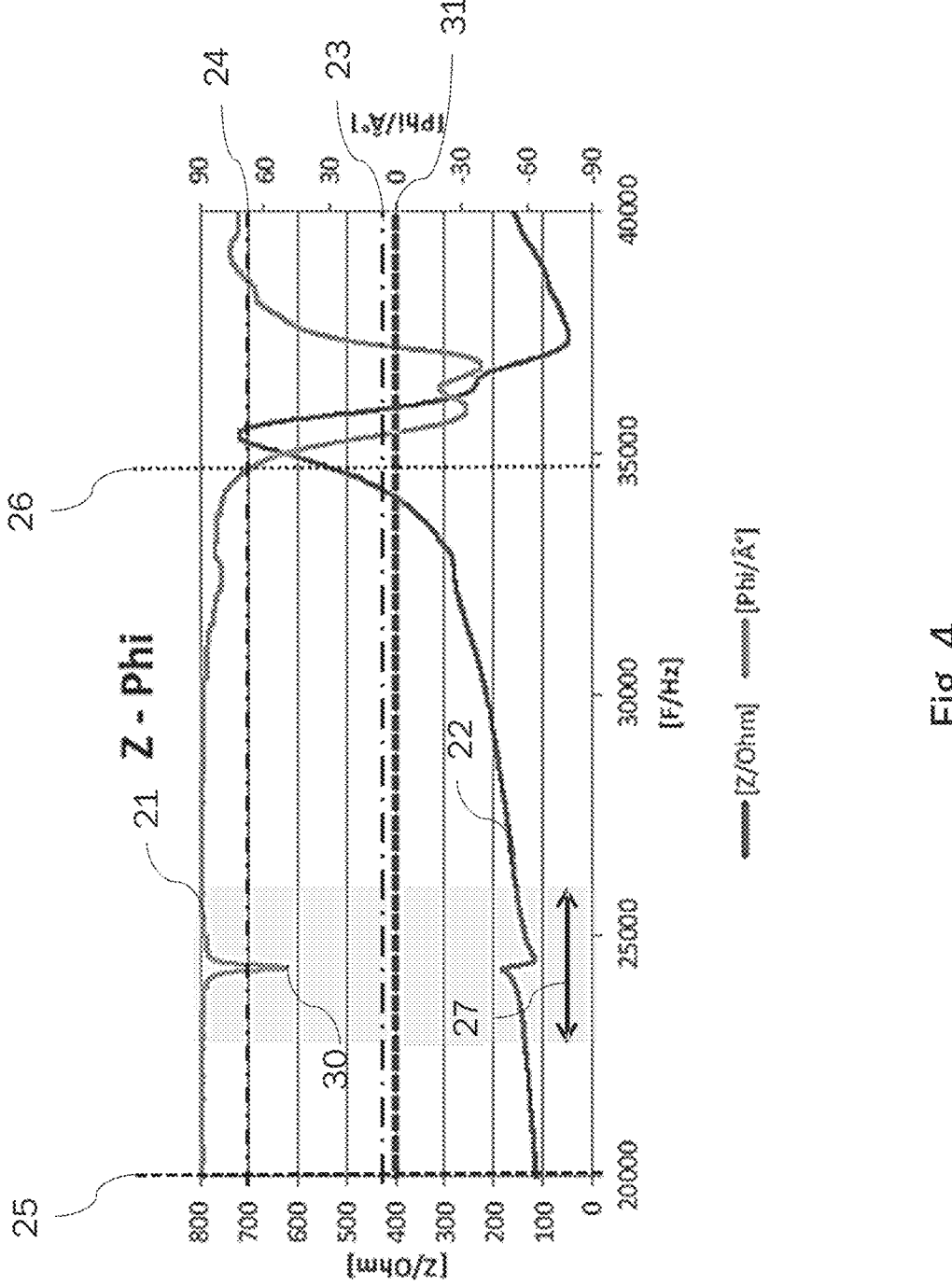
FIG. 4 shows a phase response of a phase shift determined according to the invention, as a function of frequency.

FIG. 4 shows a phase response of a phase shift determined according to the invention, as a function of frequency. Similar to FIG. 3, FIG. 4 also shows the phase on the right side of the figure along the Y axis and shows the impedance on the left side along the Y axis. Along the X axis, frequency is shown in hertz. The phase response shown in FIG. 4 comprises a minimum 30 exceeding a first phase reference value 23 while going below a second phase reference value 24. The first phase reference value in this embodiment is 3° and the second phase reference value in this embodiment is 67°. However, these values are not binding, but only exemplary.

Similar to FIG. 2, FIG. 4 also shows that it may be reasonable to specify an operational range regarding frequency (predetermined frequency band), for example, by means of the limits 25 and 26, so that the frequency generated by the ultrasound generator is unambiguously regulated to a predetermined resonance location of the tool. In some embodiments, it may additionally be helpful to limit, after a first frequency pass, the operational range (predetermined frequency band) regarding frequency to a smaller frequency range 27, so that a frequency pass may be accelerated and improved regarding accuracy.

Due to the minimum 30 going below the second phase reference value 24 and exceeding the first phase reference value 23, according to the invention, a minimum algorithm for regulating the frequency of the ultrasound generated by the ultrasound generator such that the phase shift is minimal, is to be used.

Figure 5:
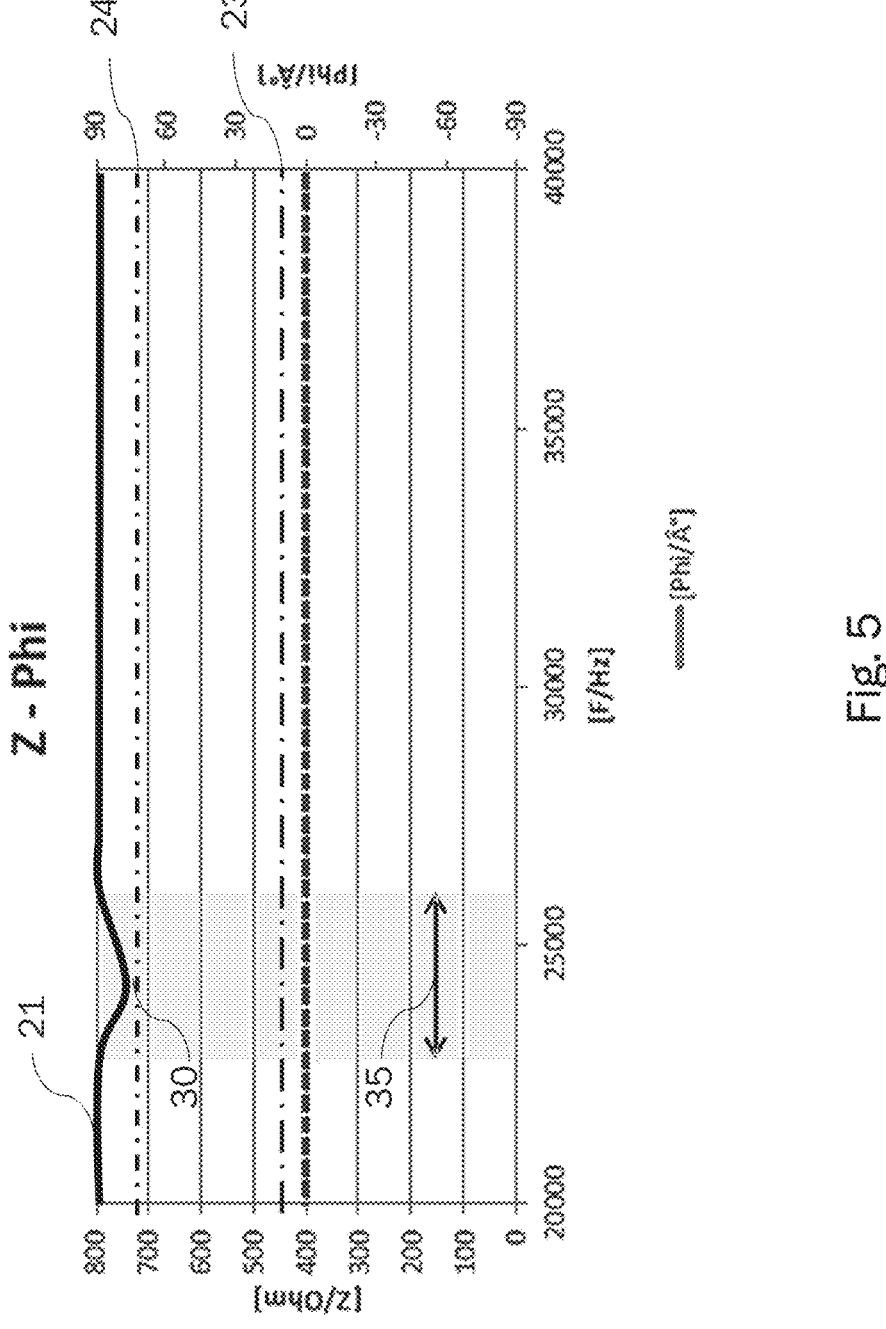
FIG. 5 shows a phase response 21 of a phase shift determined according to the invention, as a function of frequency.

FIG. 5 shows a phase response 21 of a phase shift determined according to the invention, as a function of frequency. In FIG. 5, phase is shown on the Y axis and frequency is shown along the X axis. In FIG. 5, it is apparent that the phase response 21 as a function of frequency has a minimum 30 not going below either, the first phase reference value 23 and the second phase reference value 24. Therefore, advantageously, a controller is used for regulating the frequency of the generated ultrasonic waves, which varies the frequency of the generated ultrasonic waves in a machining frequency band 35 with the minimum phase shift 30 as a center frequency. Advantageously, varying the frequency and the minimum of the phase shift may occur more quickly and with a larger interval of the frequency points, respectively, at the edge of the machining frequency band 35, compared to the center of the machining frequency band 35. This has an advantage that a rapid regulation in determining the phase shift due to signal noise may be prevented.

Advantageously, after each pass of the frequency band, the minimum of the phase shift may be re-determined and the frequency band in which the frequency is being varied may be correspondingly adapted.

Figure 6:
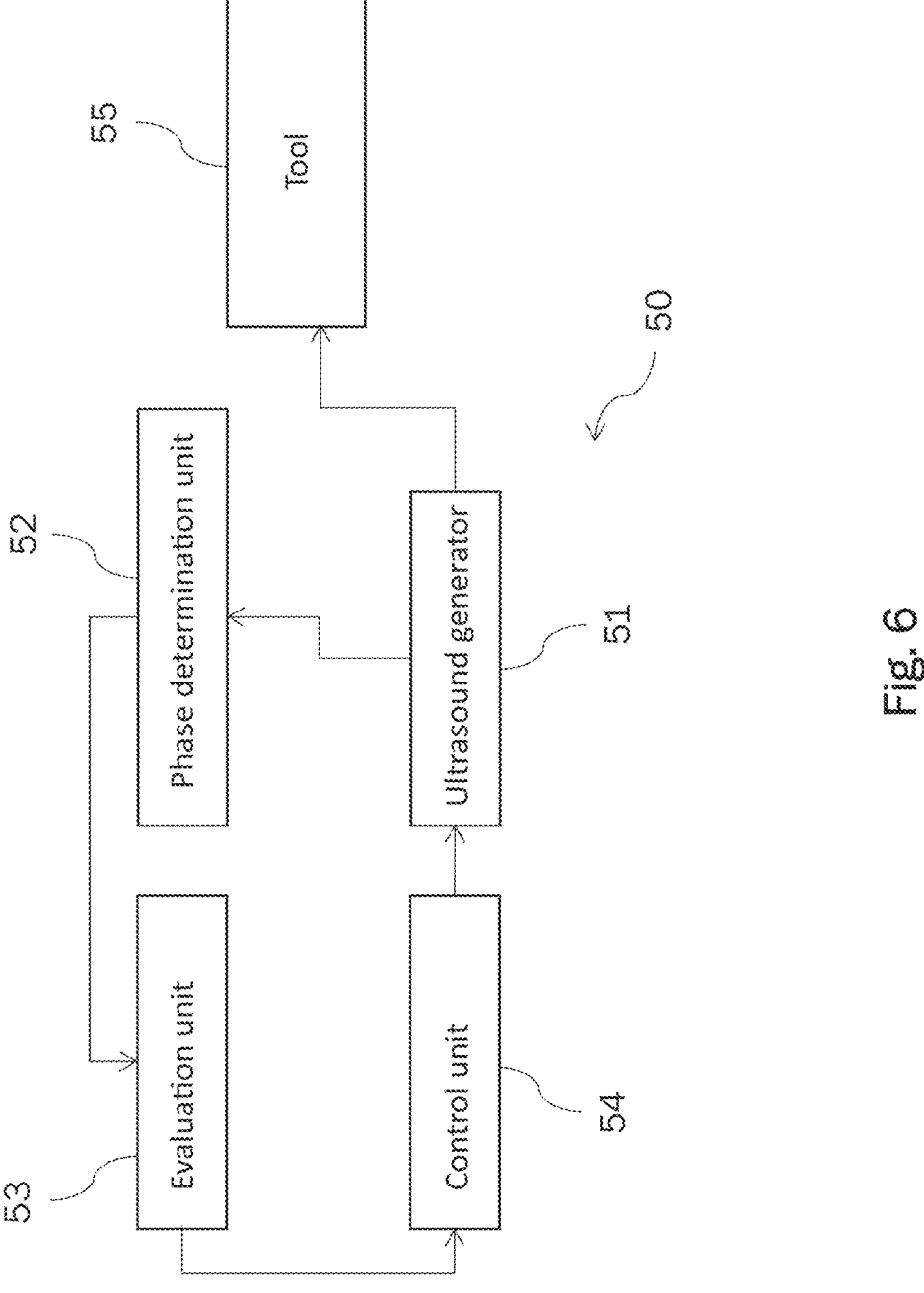
FIG. 6 schematically shows a system for controlling an ultrasound generator of a machine tool according to an embodiment of the invention.

FIG. 6 schematically shows a system 50 for controlling an ultrasound generator of a machine tool according to an embodiment of the invention. Within the system of the invention, functional units may be added, separated, merged, and/or modified regarding their partition.

The system 50 comprises an ultrasound generator 51, a phase determination unit 52, an evaluation unit 53, and a control unit 54. The ultrasound generator 51 is configured to vibrate a tool 55 or part of a tool 55, particularly with a frequency between 20 and 40 kHz (ultrasound), for machining a workpiece. Thereby, the ultrasound generator 51 is configured to vary the frequency. In some embodiments, the ultrasound generator 51 may be configured to serially generate ultrasonic waves with different frequencies. In some embodiments, the ultrasound generator 51 may be configured to generate an ultrasonic wave comprising multiple superimposed ultrasonic waves with different frequencies.

Preferably, all frequency points of the different frequencies generated by the ultrasound generator 51 are part of a predetermined frequency band that determines a possible operational range regarding frequency. This may have the advantage of ensuring that the regulation of the frequency also satisfies the requirements of the workpiece machining regarding frequency.

In particularly advantageous embodiments, the ultrasound generator 51 may be configured to generate ultrasonic waves with different frequencies by means of a sweep (frequency pass) of a predetermined frequency spectrum. In some embodiments, the frequency spectrum of the different frequencies, particularly of a sweep (frequency pass), may depend on a tool (mass, temperature, geometry), machining characteristics (feed, infeed, rotational speed), and/or one or more workpiece properties, such as material, geometry, size, mass. Therefore, in some embodiments, the ultrasound generator 51 may comprise a voltage-controlled oscillator (VCO).

In advantageous embodiments, the ultrasound generator 51 may comprise piezo motors for applying ultrasonic waves to the tool 55.

In some embodiments, the ultrasound generator may comprise a digital-analog converter (Digital-Analog-Converter/DAC) for generating an electrical signal at a predetermined frequency, which may, for example, be converted by a piezo motor to ultrasound with the predetermined frequency.

The phase determination unit for determining a phase shift of the ultrasound may, for example, be configured to comprise a phase shift between electric current and electric voltage of an electrical signal with a frequency for generating ultrasound, particularly by means of a piezo motor.

This may occur, for example, by means of an analog or a digital circuit. Therefore, in some embodiments, the phase determination unit 52 may comprise one or more analog-digital converters (ADC). Thereby, the phase determination unit 52 may advantageously be connected to the ultrasound generator 51 by means of an analog or a digital signal transmission. In some embodiments, the phase determination unit 52 may be configured for determining a phase shift for the execution of an algorithm or a program code, respectively.

The phase determination unit may, for example, comprise a unit for subtracting two phase values and/or for executing an algorithm for determining the phase shift of two signals. In some embodiments, for determining a phase shift, the phase determination unit may comprise an analog circuit for determining the phase shift.

In some embodiments, the phase determination unit may be connected to the tool 55.

The evaluation unit 53 may be configured to analyze the determined phase shift and to determine a regulation algorithm in dependence of the analysis of the phase shift. Thereby, the analysis may comprise quantitatively comparing the phase shifts determined as a function of frequency to one or more phase reference values. In some embodiments, the analysis may comprise a qualitative analysis of the determined phase shifts as a function of frequency, especially a comparison of the determined phase shifts to reference phase responses as a function of frequency.

Preferred examples for regulation algorithms that may be used within the invention are varying the frequency in a predetermined frequency band around a minimum (frequency pass), particularly sweeping, wherein the frequency band is re-determined after a pass depending on a minimum of the phase shift; minimum algorithms configured to minimize a regulation magnitude by means of a regulation parameter (manipulated variable), particularly by means of convex optimization; as well as regulation algorithms configured to regulate a regulation magnitude by means of a manipulated variable (regulation parameter) to a predetermined value, for example a zero crossing.

A minimum algorithm may, for example, the steps of detecting a minimum at a first frequency, increasing the first frequency to a second frequency; comparing the phase shift of the first frequency to the phase shift of the second frequency; taking the second frequency as the first frequency, when the phase shift of the second frequency is smaller than the phase shift of the first frequency; reducing the first frequency to a second frequency when the phase shift of the second frequency is larger than the phase shift of the first frequency, comparing a phase shift of the second frequency to the phase shift of the first frequency; taking the second frequency as the first frequency, when the phase shift of the second frequency is smaller than the phase shift of the first frequency.

Depending on the number of switches between increasing and decreasing the first frequency, the step size in increasing and decreasing the frequency, respectively, may be enlarged and reduced, respectively.

The control unit 54 is configured to control, depending on the determined regulation algorithm and on the determined phase shift, the ultrasonic wave generated by the ultrasound generator 51 regarding frequency. Therefore, the control unit 54 may be connected to the ultrasound generator 51 by means of an analog or a digital signal transmission.

This has an advantage that, for different workpiece machinings of the machine tool by means of ultrasound, the frequency of the ultrasound may be easily and efficiently regulated such that the vibrated tool is as resonant to the ultrasonic wave as possible. Thereby, an energy expenditure (in the form of ultrasound) may be reduced to deflect an operational range of a tool with a predetermined amplitude.

Using different regulation algorithms based on the analysis of the phase shift as a function of frequency has an advantage that controllers (regulation algorithms) may be designed particularly efficiently and stable. Further, errors in determining the phase shift as a regulation magnitude, for example due to noise, may thereby be neglected.

In preferred embodiments, the evaluation unit 53 may be configured to analyze the phase shift during workpiece machining, and determine a regulation algorithm based on the analysis.

In preferred embodiments, the control unit may be configured for changing the regulation algorithm during workpiece machining.

This has an advantage that, particularly in a modification of the system parameters, for example, due to a modification of the workpiece properties (for instance size, mass), of the machining characteristics, and/or of a modification of the tool characteristics (mass, temperature), the ultrasound frequency may be adapted instantaneously. Thereby, the tool may be protected and the workpiece quality may be improved.

Figure 7:
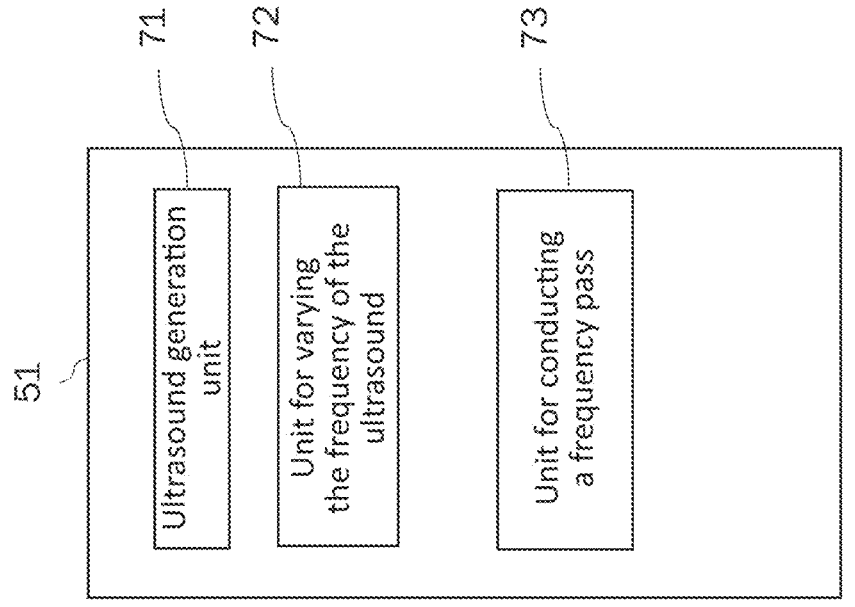
FIG. 7 schematically shows an ultrasound generator according to an embodiment of the invention.

FIG. 7 schematically shows an ultrasound generator according to an embodiment of the invention. The ultrasound generator 51 may comprise an ultrasound generation unit 71, particularly in form of a piezo motor. Further, the ultrasound generator 51 may comprise a unit 72 for varying the frequency, particularly in form of a voltage-controlled oscillator (VCO).

In some embodiments, the ultrasound generator 51 may comprise a unit 73 for performing a frequency pass, particularly a frequency sweep. In some embodiments, the unit 73 for conducting a frequency pass may comprise a unit 72 for varying the frequency of the ultrasound and/or an ultrasound generation unit.

Figure 8:
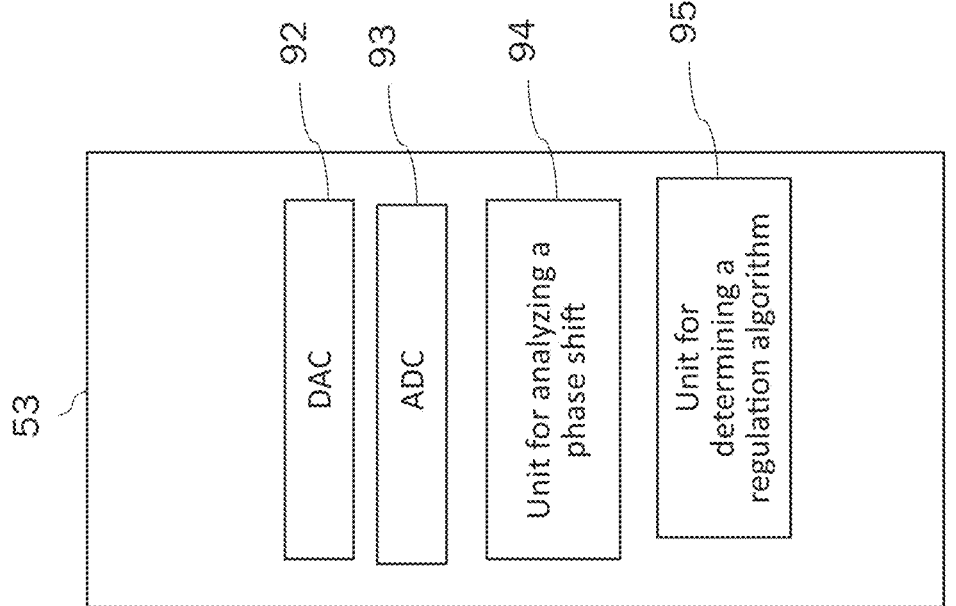
FIG. 8 schematically shows an evaluation unit according to an embodiment of the invention.

FIG. 8 schematically shows an evaluation unit 53 according to an embodiment of the invention. In some embodiments, the evaluation unit 53 may comprise a digital-analog converter (DAC) 92 for converting a digital signal to an analog signal, particularly for controlling a voltage-controlled oscillator or for controlling piezo motors. Further, the evaluation unit 53 may comprise an analog-digital converter (ADC) 93 for converting an analog signal, particularly an analogously available signal comprising the phase shift as information, to a digital signal.

The evaluation unit 53 may comprise a unit 94 for analyzing a phase shift as a function of frequency. Further, the evaluation unit may comprise a unit 95 for determining a regulation algorithm, particularly depending on an analysis of a phase shift.

Figure 9:
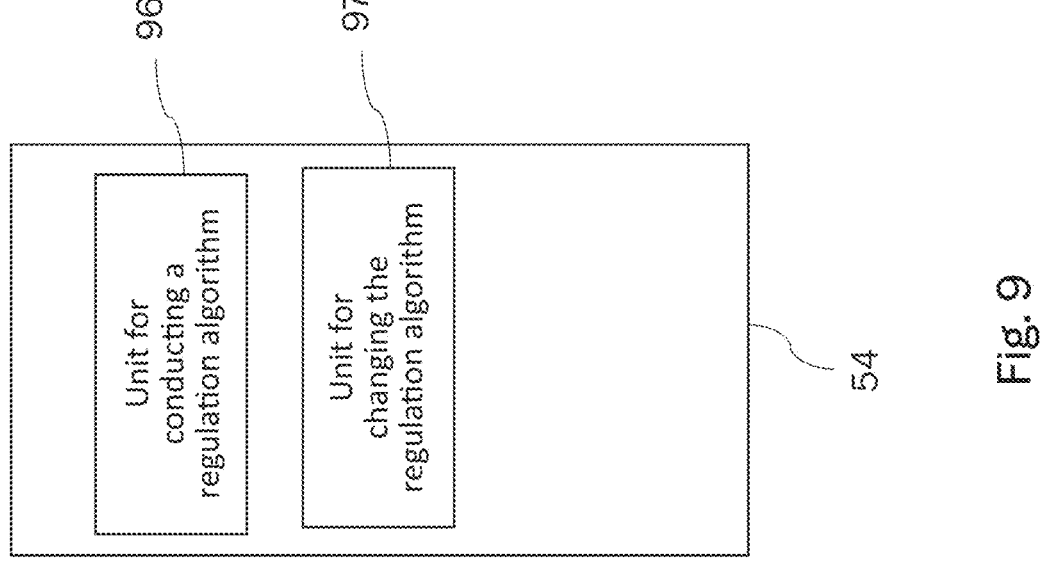
FIG. 9 schematically shows a control unit according to an embodiment of the invention.

FIG. 9 schematically shows a control unit 54 according to an embodiment of the invention. The control unit may comprise a unit 96 for executing a regulation algorithm, particularly for regulating a frequency depending on a phase shift and/or an impedance.

Moreover, the control unit 54 may comprise a unit 97 for changing the regulation algorithm, particularly during workpiece machining.

In some embodiments, the control unit 54 may be directly connected to the phase determination unit in a digital or an analog manner.

The invention claimed is:

1. A method for controlling an ultrasound generator of a machine tool for generating ultrasound for machining a workpiece, comprising the steps of:
   generating electrical signals with different frequencies for machining a workpiece, the frequencies being in the ultrasonic frequency range;
   applying ultrasonic waves to a tool by means of the electrical signals;
   determining a phase shift of the ultrasound as a function of frequency;
   analyzing the phase shift as a function of frequency;
   determining a regulation algorithm for controlling the frequency of the ultrasound generated by the ultrasound generator depending on the analysis of the phase shift; and
   regulating the frequency of the ultrasound generated by the ultrasound generator in dependence of the phase shift of the ultrasound and of the determined regulation algorithm.

2. The method of claim 1, wherein when the analysis of the phase shift reveals that, at a frequency point, a first phase reference value is gone below, the method comprises the steps of:
   specifying a phase-shift regulation target;
   regulating the frequency generated by the ultrasound generator for reaching the phase-shift regulation target; and
   machining a workpiece while the frequency of the ultrasonic waves is being regulated.

3. The method of claim 2, wherein
   when the phase-shift regulation target can be reached by means of two different frequencies, the frequency generated by the ultrasound generator for reaching the phase-shift regulation target is being regulated to a higher frequency of the two different frequencies.

4. The method of claim 1, wherein
when the analysis of the phase shift reveals that, at all frequency points, a first phase reference value is exceeded and, in at least one frequency point, a second phase reference value is gone below, the method comprises the steps of:
regulating the frequency generated by the ultrasound generator such that the phase shift is minimal; and
machining a workpiece while the frequency of the ultrasonic waves is being regulated.

5. The method of claim 1, wherein
when the analysis of the phase shift reveals that, at all frequency points, a second phase reference value is exceeded, the method comprises the steps of:
determining a frequency of the different frequencies, where the determined phase shift at this frequency is minimal;
machining a workpiece while the frequency of the ultrasonic waves is being regulated; and
varying the frequency in a predetermined frequency band around the determined frequency during workpiece machining.

6. The method of claim 5, comprising the steps of
determining the phase shift between the generated ultrasound and the reflected ultrasonic wave as a function of frequency while the frequency is being varied;
analyzing the phase shift as a function of frequency;
determining a new frequency from the frequency band around the determined frequency with minimum phase shift; and
varying the frequency in the predetermined frequency band around the newly determined frequency.

7. The method of claim 1, comprising the steps of:
determining the phase shift between the generated ultrasound and the reflected ultrasonic wave as a function of frequency during workpiece machining;

analyzing the phase shift as a function of frequency during workpiece machining; and
changing the regulation algorithm for controlling the frequency of the ultrasound generated by the ultrasound generator depending on the analysis of the phase shift.

8. A system for controlling an ultrasound generator of a machine tool for generating ultrasound for machining a workpiece, comprising:
an ultrasound generator, which, in operation, generates ultrasonic waves for machining a workpiece;
a phase determination unit, which, in operation, determines a phase shift of the ultrasound;
an evaluation unit, which, in operation, analyzes the phase shift as a function of frequency and determines a regulation algorithm depending on the analysis of the phase shift; and
a control unit, which is configured, in operation, to regulate the frequency of the ultrasound in dependence of the phase shift determined by the phase determination unit and of the regulation algorithm determined by the evaluation unit.

9. The system of claim 8, wherein
the evaluation unit, in operation, analyzes the phase shift and determines the regulation algorithm during workpiece machining, and/or
the control unit, in operation, changes the regulation algorithm during workpiece machining.

10. The system of claim 8,
which is configured to:
generate electrical signals with different frequencies for machining a workpiece, the frequencies being in the ultrasonic frequency range;
apply the ultrasonic waves to the tool by means of the electrical signals;
determine the phase shift of the ultrasound;
analyze the phase shift as the function of frequency; and
determine the regulation algorithm for controlling the frequency of the ultrasound generated by the ultrasound generator depending on the analysis of the phase shift.

* * * * *